US010312625B2

(12) United States Patent
Andre et al.

(10) Patent No.: US 10,312,625 B2
(45) Date of Patent: Jun. 4, 2019

(54) SECURED BODY FOR MEMORY CARD READER

(71) Applicant: INGENICO GROUP, Paris (FR)

(72) Inventors: Jerome Andre, Montoison (FR); Stephane Pavageau, La Roche de Glun (FR); Olivier Berthiaud, Cornas (FR); Yann Granddidier, Lemps (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/871,606

(22) Filed: Jan. 15, 2018

(65) Prior Publication Data

US 2018/0205170 A1    Jul. 19, 2018

(30) Foreign Application Priority Data

Jan. 13, 2017    (FR) .................................... 17 50301

(51) Int. Cl.
| | |
|---|---|
| *H01R 13/447* | (2006.01) |
| *G06F 21/86* | (2013.01) |
| *G06K 7/00* | (2006.01) |
| *H01R 12/70* | (2011.01) |
| *H01R 12/71* | (2011.01) |
| *H05F 3/02* | (2006.01) |

(52) U.S. Cl.
CPC ........... *H01R 13/447* (2013.01); *G06F 21/86* (2013.01); *G06K 7/0004* (2013.01); *G06K 7/0021* (2013.01); *G06K 7/0056* (2013.01); *G06K 7/0078* (2013.01); *G06K 7/0082* (2013.01); *G06K 7/0091* (2013.01); *H01R 12/7005* (2013.01); *H01R 12/712* (2013.01); *H05F 3/02* (2013.01)

(58) Field of Classification Search
CPC ........................... H01R 12/721; H05K 1/0275
USPC ................................................... 439/630–637
See application file for complete search history.

(56) References Cited

U.S. PATENT DOCUMENTS

| | | | | |
|---|---|---|---|---|
| 5,233,505 A | * | 8/1993 | Chang | .................... G06F 21/86 |
| | | | | 361/679.02 |
| 6,641,441 B2 | * | 11/2003 | Liu | ..................... G06K 7/0013 |
| | | | | 439/630 |

(Continued)

FOREIGN PATENT DOCUMENTS

| | | |
|---|---|---|
| FR | 2889756 A1 | 2/2007 |
| FR | 2983995 A1 | 6/2013 |

(Continued)

OTHER PUBLICATIONS

French Preliminary Report on Patentability dated May 18, 2017 for French Patent Application No. 1750301, filed Jan. 13, 2017.

(Continued)

*Primary Examiner* — Ross N Gushi
(74) *Attorney, Agent, or Firm* — David D. Brush; Westman, Champlin & Koehler, P.A.

(57) ABSTRACT

A memory card reader body of a generally parallelepiped shape has a slot for insertion of a memory card and a housing to receive a memory card connector. The reader body has an upper cover and a lower base. The upper cover is made out of metal and the reader body further includes a printed-circuit board affixed to an upper face of the upper cover. The printed-circuit board includes at least one protection element.

12 Claims, 6 Drawing Sheets

(56) References Cited

U.S. PATENT DOCUMENTS

| | | | | |
|---|---|---|---|---|
| 6,853,093 B2* | 2/2005 | Cohen | H01L 23/576 | 257/678 |
| 7,015,823 B1* | 3/2006 | Gillen | G08B 13/128 | 340/541 |
| 7,180,008 B2* | 2/2007 | Heitmann | G06F 21/87 | 174/261 |
| 7,503,805 B2* | 3/2009 | Chang | H01R 13/2442 | 200/51.1 |
| 7,517,237 B2* | 4/2009 | Ting | G06K 13/08 | 235/441 |
| 7,628,652 B2* | 12/2009 | Ting | H01R 13/405 | 439/630 |
| 7,670,186 B2* | 3/2010 | Ting | H01R 12/714 | 439/630 |
| 7,775,835 B2* | 8/2010 | Ting | H01R 12/62 | 439/630 |
| 8,100,722 B2* | 1/2012 | Hu | H01R 13/2442 | 439/352 |
| 8,123,133 B2* | 2/2012 | Dubois | G06F 21/87 | 235/486 |
| 8,164,912 B2* | 4/2012 | Tong | G06F 21/86 | 174/520 |
| 8,223,503 B2* | 7/2012 | Shi | H05K 1/0275 | 361/749 |
| 8,430,694 B2* | 4/2013 | Tung | H01R 13/64 | 439/629 |
| 8,573,989 B2* | 11/2013 | Lambert | G06K 7/0021 | 439/135 |
| 8,593,824 B2* | 11/2013 | Kirmayer | H05K 1/0275 | 361/672 |
| 8,662,394 B2* | 3/2014 | Bonnet | H05K 1/0275 | 235/439 |
| 9,013,336 B2* | 4/2015 | Schulz | G06F 1/1626 | 341/20 |
| 9,450,586 B2* | 9/2016 | Hadley | H05K 1/0275 | |
| 9,530,029 B2* | 12/2016 | Jadeau | H05K 1/0275 | |
| 2006/0205278 A1* | 9/2006 | Kuo | G06K 7/0034 | 439/630 |
| 2007/0177363 A1* | 8/2007 | Jayanetti | G06F 21/86 | 361/760 |
| 2013/0140364 A1 | 6/2013 | McJones et al. | | |
| 2014/0327998 A1 | 11/2014 | Barneron et al. | | |
| 2015/0263459 A1 | 9/2015 | Pavageau | | |
| 2015/0295400 A1 | 10/2015 | Pavageau | | |

FOREIGN PATENT DOCUMENTS

| | | |
|---|---|---|
| FR | 2997570 A1 | 5/2014 |
| FR | 2997530 A1 | 5/2015 |

OTHER PUBLICATIONS

French Written Opinion dated May 18, 2017 for French Patent Application No. 1750301, filed Jan. 13, 2017.

\* cited by examiner

Prior Art

SECURED BODY FOR MEMORY CARD READER

1. FIELD OF THE INVENTION

The invention is situated in the field of memory card readers. The invention more particularly relates to a memory card reader that is to be mounted in a memory card reader terminal. Such a terminal can be a payment terminal or an identification terminal. More particularly, the invention relates to any type of terminal that can include a memory card reader.

2. PRIOR ART

Memory card reader terminals comprise, in addition to a memory card reader, a certain number of components such as a keypad, a screen, one or more processors, memory, an electrical power source. For several years now, memory card reader terminals have seen a great increase in their functions. This is especially true for payment terminals. In addition to the payment function, the terminals have embedded functions for carrying out network communications, detecting contactless memory cards, managing coupons (for example loyalty coupons), etc.

In addition to the increase in such auxiliary functions, memory card reader terminals must also be resistant to various attacks or attempts at fraud to which they are frequently subjected. In order to obtain homogeneous resistance by terminals to attacks, international standards have been laid down. In the field of payment for example, the PCI PED (or Payment Card Industry—Pin Entry Device) standard has laid down requirements in terms of intrusion and detection of attempts to attack terminals. This is not the only standard in force.

However, owing to these standards, terminals that previously had low-level protection are being gradually replaced by increasingly secured terminals. Among the different aspects of securing terminals, it is more particularly the protection of the memory card reader that industrialists in this sector are concerned with. The memory card reader indeed is a weak link in the memory card reader terminal. This is because the memory card reader comprises a slot for inserting a memory card, and this slot makes the interior of the terminal accessible from the exterior. In particular, attackers seek to access the memory card connector. The memory card connector is the part of the memory card reader that comes into contact with the chip or the micro-processor embedded in the memory card. When an attacker manages to access this connector without being spotted, then he can intercept and read the data exchanged between the chip or the micro-processor of the card and the processor of the memory card reader terminal. The pieces of intercepted data include especially the secret code entered by the customer when he is asked for this secret code which can be conveyed without encryption in certain unsecured (or poorly secured) smart cards.

This explains why much effort has been devoted to securing memory card readers. Thus for example memory card readers have been provided with lattice-based protection. This protection prevents any insertion made by piercing the terminal. When there is an attempt to make an object penetrate the protective enclosure, a short-circuit is produced causing the terminal to be put out of action. Besides, modifications seeking to protect memory card connectors against electrostatic discharge or against wear and tear have also been proposed. For example, metal parts are disposed at the entry to the memory card reader to provide mechanical guidance (preventing wear and tear) and/or to provide for the discharging of the card prior to its insertion into the memory card reader. These metal parts commonly take the form of metal guiding rods with a height of a few millimeters. Another example consists in adding metal parts that take the form of a card-discharging comb.

All these modifications have resulted in great complexity of manufacture. Besides, the cost of manufacturing has also increased. At present, the requirements in terms of standards for security are such that, when manufacturing a reader terminal, it is necessary to envisage several steps bringing together, all at the same time, the staggered soldering of components, the need to have reflow-resistant components etc. In addition to the complexities of manufacturing the memory card reader terminal, these methods make the maintenance of the terminals produced highly complicated or even impossible, thus raising difficulties for the maintenance service providers as well as for the manufacturers of memory card reader terminals.

Figure 1:
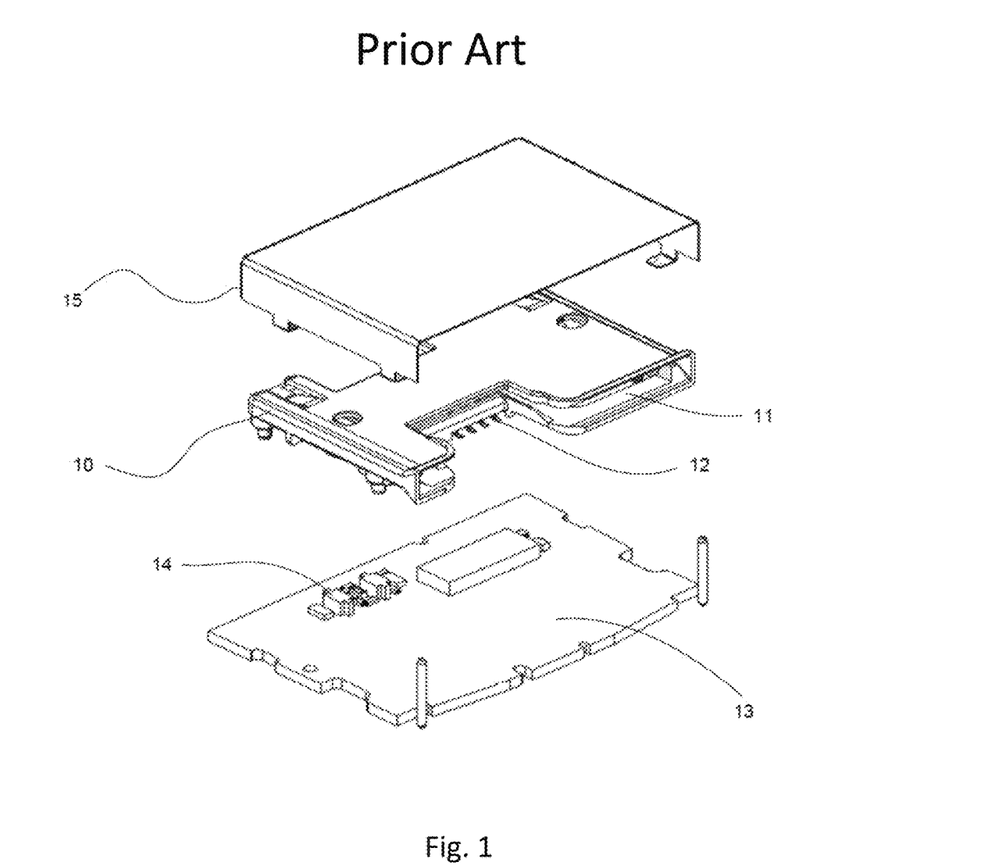
FIG. 1, already described with reference to the prior art, presents a classic architecture of a memory card reader.

Referring to FIG. 1, a classic assembly of a memory card reader is described. This memory card reader comprises a memory card reader body 10, comprising a memory card insertion slot 11. The memory card connector is directly integrated into the memory card reader. It comprises pins 12 for connection to the printed-circuit board 13 (seen in a partial view) enabling the operation of the reader and its interconnection with the other components of the device within which it is installed (this printed-circuit board 13 is generally the motherboard of the memory card reader terminal). In this respect, the printed-circuit board 13 also comprises electronic components 14. For its protection, the memory card reader 10 is covered with a full protection element 15 as well as a front protection element (not shown).

It is therefore necessary to propose an architecture of a memory card reader that is intrinsically secured but easier to assemble. Such an architecture has been disclosed for example in the patent application FR2997530 published on May 2, 2014. This patent application more particularly describes a memory card reader body of a generally rectangular parallelepiped shape, comprising a slot for inserting a memory card. The body of the memory card reader comprises, on a rear face, a receiving housing to receive a memory card connector, this receiving housing having predetermined volume shape and comprising a conductive track that takes the form of a lattice. Thus, the solution described in this patent application FR2997530 has several advantages. On the one hand, the mounting is made easier because the memory card connector is no longer directly integrated into the body of the memory card reader: this configuration indeed enables the soldering first of all of the memory card connector to the mother board of the reader terminal and then the affixing of the body of the memory card reader to the motherboard by covering the memory card connector. On the other hand, it is no longer necessary to provide for additional protection, since the protection lattice is directly integrated into the receiving housing of the connector. This lattice is more particularly made with the laser etching technique known as LDS (Laser Direct Structuring). This technique nevertheless has drawbacks, especially in terms of passage to industrial-scale manufacturing and costs: indeed, having to plot an MID (molded Interconnected device) track on an existing plastic part, with complex shapes and volumes, is difficult because of the difficulty of access by the laser to certain zones. This especially lengthens the time needed to create the part and increases costs. There is therefore a need for a memory card reader architecture that offers increased simplification in terms of production and assembling of the different elements that constitute it (especially as regards the body of the memory card reader) while ensuring a high level of securing of the reader once it is assembled.

3. SUMMARY OF THE INVENTION

The present technique partly resolves the problems posed by the prior art. The present technique indeed relates to a memory card reader body comprising a slot for the insertion of a memory card and housing to receive a memory card connector, said reader body comprising an upper cover and a lower base. Such a memory card reader body is distinguished however from prior art reader bodies by the fact that it comprises a third part, distinct from the lower base or the upper cover. This third part takes the form of a printed-circuit board affixed to an upper face of said upper cover, said printed-circuit board comprising at least one protection element.

Thus, the proposed three-part architecture enables the implementing of a memory card reader body that is less costly and easier to produce than with the prior art solutions but nevertheless offers a high level of protection against attempts at fraudulent access to sensitive signatures within the reader. In particular, it is no longer necessary to resort to complicated and costly LDS etching techniques and to the production of MID parts: the printed-circuit board can take the form of a classic printed-circuit board on an epoxy base inasmuch as it has to be coupled with the upper cover which thus increases its mechanical resistance.

This three-part architecture also makes it easier to mount the memory card reader while at the same time extending the protection elements. Indeed, through the configuration of the memory card reader body, the invention makes it possible firstly to solder the memory card connector to a printed-circuit board and then to join the three parts of the memory card reader body by covering the memory card connector. The use of a reader body, the insertion slot of which is formed by means of two parts (lower base and upper cover) that can be fitted to each other, furthermore enables the simple implementation of complementary characteristics that would have been difficult and/or costly to implement with a body made in only one part, owing to the highly technical nature of these characteristics.

In one particular embodiment of the proposed technique, the upper cover is made of metal.

Thus, this part can be produced simply at low cost and on a large scale, for example using known techniques for cutting out and embossing metal plates. Besides, an upper cover made of metal has increased resistance as compared with traditional approaches based on plastic materials: the memory card reader is thus more robust and the printed-circuit board is reinforced by this metal part to which it is affixed. The reliability of the reader is thus further improved as compared with the prior-art solution.

In one particular embodiment, the printed-circuit board covers a major part of the upper face of the upper cover and the protection element extends substantially over a major part of said printed-circuit board.

In this way, high-level securing is provided against any attempt at intrusion through the upper cover of the memory card reader.

In one particular embodiment, the protection element takes the form of at least one lattice and the etching density of said protection element is variable according to the location of the protection element.

In this way, the production costs of the printed-circuit board can be further reduced while at the same time preserving high-level securing for the memory card reader. Besides, the zones of high etching density, the reliability of which is sometimes degraded by severe or harsh climatic conditions (for example conditions of great heat and humidity), can be confined to zones that are properly limited in terms of location. The general reliability of the reader is further improved.

In another particular embodiment of the proposed technique, the upper cover comprises at least one protrusion extending substantially perpendicularly to the upper face of the upper cover.

These protrusions form support surfaces for the printed-circuit board, once this PCB has been positioned on the upper cover. Thus, they offer preferred affixing points for the printed-circuit board. They also make it possible to raise the height of the printed-circuit board relative to the upper cover. In this way, both faces of the printed-circuit board can be used for the installation of electronic components. This further elevation also creates sufficient space for the memory card connector to take position beneath the printed-circuit board, and thus be better secured. Finally, these protrusions reinforce the mechanical resistance of the upper cover, which thus becomes more resistant to folding for example.

In one particular embodiment the upper cover comprises, in proximity of a hole passing through said upper cover, at least one metal tongue or tab extending substantially perpendicularly to a lower face of the upper cover.

These metal tabs thus form passive baffles, i.e. physical obstacles making it complicated, within the assembled memory card reader, to obtain fraudulent access to the zones in which sensitive signals travel in transit.

In yet another particular embodiment, the upper cover comprises at least one card-landing mechanism.

Thus, the wear and tear of the contacts of the memory card and of the metal blades of the connector is limited during the numerous operations of inserting and removing memory cards into and from the reader.

In one particular embodiment, this card-landing mechanism comprises a mobile counter-pressure element and the upper cover comprises a housing to receive said mobile counter-pressure element, said mobile counter-pressure element being mobile between two positions:

a position of reading in which said mobile counter-pressure element exerts pressure on a memory card inserted into the insertion slot of the memory card reader;

a waiting position in which said mobile counter-pressure element is at least partially positioned in said receiving housing.

In one particular embodiment, said housing to receive the mobile counter-pressure element takes the form of a hole within said upper cover.

In this way, the compactness of the body of the memory card reader is preserved without sacrificing security, the printed-circuit board then acting as a protection lid or protection roof for the housing for receiving the mobile counter-pressure element, and therefore for the card-landing mechanism as a whole.

In one particular embodiment, the lower base comprises at least one card-braking device.

In one particular embodiment, the lower base comprises at least one electrostatic discharge zone.

According to another aspect the proposed technique also relates to a memory card reader terminal that comprises a memory card reader body as presented here above.

According to yet another aspect, the proposed technique also relates to a method for assembling a memory card reader body as explained here above. Such a method comprises:
- a step for affixing a card connector to a memory card on a mother board;
- a card for positioning the lower base on said memory card connector;
- a step for assembling the upper cover on said lower base;
- a step for affixing the printed-circuit board to the upper face of said upper cover.

In this way, the assembling and affixing of the memory card reader to the motherboard are simplified and can be made in a restricted number of steps.

The different embodiments mentioned here above can be combined with each other to implement the invention.

4. FIGURES

Other features and advantages of the invention shall appear more clearly from the following description of a preferred embodiment, given by way of a simple, illustratory and non-exhaustive example and from the appended figures of which.

5. DETAILED DESCRIPTION

5.1. General Principle

The general principle of the invention consists in proposing a memory card reader architecture that relies on a separation of the reader into two distinct parts or functional units:

- a first part—that corresponds to the memory card connector—through which the memory card signals travel in transit and that also comprises means for detecting the presence of a memory card (these means are called "switches"), and that can also carry out a part of the electrostatic discharge;
- a second part—that corresponds to the body of the memory card reader—enabling the insertion of the memory card, carrying out on the one hand the guiding and absorption of forces of the memory card and, on the other hand, a part of the electrostatic discharge of the card, and also providing protection for the signals exchanged between the memory card and the memory card connector.

According to the proposed technique, the body of the memory card reader is itself formed by three main distinct parts: a lower base, an upper cover or hood and a printed-circuit board comprising one or more protection elements that extend over a significant portion of its surface. The lower base and the upper cover can be fitted into each other and, once assembled, form an insertion slot for inserting a memory card. The upper cover and the printed-circuit board are furthermore shaped and sized so that the printed-circuit board can be fixed to the upper cover.

Figure 2A:
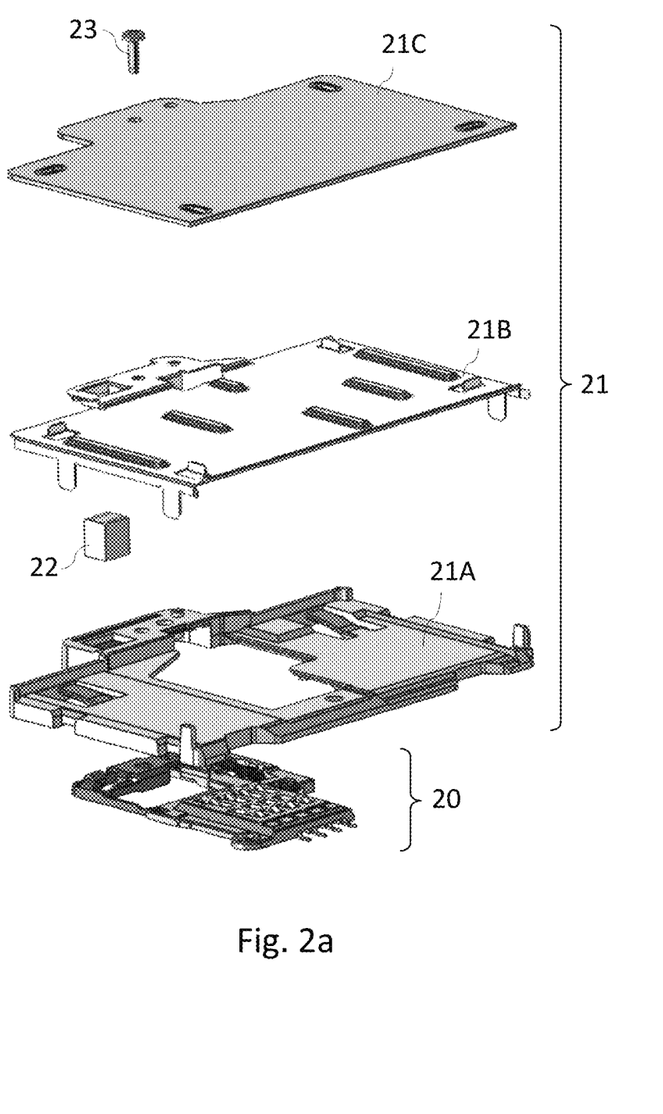
FIG. 2A is an exploded view illustrating the general principle of the invention, namely the separation of the body of a memory card reader into three main distinct parts.

The general principle of the invention is described in greater detail with reference to FIG. 2A. According to the proposed technique, a memory card connector 20 is built independently of a body 21 of the memory card. The memory card connector 20 is designed to enable a reading of the signals coming from the memory card (not shown). To this end, the memory card connector 20 comprises a certain number of pins (eight in FIG. 2a) enabling contact with corresponding zones of the chip of the memory card (generally six or ten zones depending on the type of memory card). These pins are generally metal spring leaves that take position on the surface of the chip. The memory card connector 20 is also meant to be connected to a main printed-circuit board (not shown), typically the motherboard of the reader terminal within which it is set up, in order to ensure the operation of the reader and its interconnection with the other components of the reader terminal. Here below in the document, this main printed-circuit board to which for example the connector 20 is soldered is designated by the name "motherboard" in order to avoid any confusion with the printed-circuit board of the body of the memory card reader according to the proposed technique which covers the upper cover. It must however be noted that the term "motherboard" should not be understood in a restrictive sense and that, in certain embodiments, the main printed-circuit board is not necessarily the motherboard of the reading terminal. Since the object of the disclosure is not the motherboard, it shall not be described in detail further below.

The memory card connector 20 is independent of the body of the memory card reader 21. In other words, the memory card connector 20 is not assembled with the body of the memory card reader 21 before being assembled with the motherboard of the reader terminal: according to the proposed technique, the memory card connector 20 is affixed firstly to the motherboard and then the body of the memory card reader 21 is assembled above the connector 20.

As described previously, the body of the memory card reader 21 itself comprises three main parts: a lower part 21A, an upper cover 21B and a printed-circuit board 21C, that surmounts the upper cover 21B. The lower base 21A comprises a housing to receive the memory card connector 20. This housing takes the form of a hole passing through the lower base 21A from one side to the other; the connector 20 gets housed in this hole when the lower base 21A is positioned on the motherboard. In other words, the memory card connector 20 is first of all affixed to the motherboard, and then the lower base 21A of the body of the memory card reader is positioned on the motherboard in a second stage, around the previously installed connector. The upper cover 21B is then joined to the lower base 21A so as to form a slot for inserting a memory card within the reader. Finally, the printed-circuit board 21C is affixed to the upper face of the upper cover so as to cover a major part of it, ideally its entirety. As an alternative, it can happen that the block formed by the upper cover 21B and the printed-circuit board 21C has been pre-assembled, before the phase for mounting the memory card reader. In this case, it is the totality of this pre-assembled block that is positioned on the lower base 21A during the mounting of the reader.

The printed-circuit board 21C comprises at least one protection element that takes for example the form of one or more intrusion-detecting lattice elements or the form of one or more intrusion-detecting continuous tracks (for example a ground circuit and two lattices at different potentials). This protection element or these protection elements are positioned so as to cover a major part on the surface of the printed-circuit board 21C. Ideally, they are distributed on the entire surface of the printed-circuit board 21C so as to provide increased securing of the memory card reader.

This three-part architecture of the body of the memory card reader 21 has numerous advantages as compared with the prior art solutions.

The fact is that the joining and affixing of the memory card reader to the motherboard are simplified and can be carried out in a limited number of steps. The implementing of the reader body, of which the insertion slot is formed by means of two nesting parts (lower base and upper cover) furthermore enables the simple application of complementary characteristics that would have been difficult and/or costly to implement with a body made in only one piece, owing to the technical nature of these characteristics. Examples of such characteristics are described in detail here below, with reference to the presentation of one particular embodiment of the proposed technique.

Besides, the coupling between an upper cover and a printed-circuit board provides for a promising compromise between, on the one hand, the level of securing of the reader once it is assembled and, on the other hand, the complexity and cost of production of the parts of the component, especially when this approach is compared with complex prior art solutions based on the production of MID parts by means of the LDS technique for example. Indeed, with the proposed technique, the printed-circuit board can take the form of a classic printed-circuit board on an epoxy support, the robustness of which is reinforced by the thickness of the upper cover onto which it is fixed. Preferably, the upper cover is made of metal. Thus, it has increased mechanical resistance as compared with traditional solutions based on plastic materials while offering the advantage of being capable undergoing large-scale production at lower cost through the use of known techniques for cutting out and embossing metal plates for example.

Here below, a specific embodiment of the invention is described, it being understood that this embodiment in no way limits the scope of the invention. More particularly, in other embodiments of the invention, the shapes of the lower base and of the upper cover and their respective assembling means are not limited to those described here below.

5.2. Detailed Description of One Embodiment

This embodiment is presented more particularly with reference to FIGS. 2b to 7. This embodiment comprises characteristics not described hitherto. However, identical numerical references are used for elements that have already been described with reference to FIG. 2A.

Figure 2B:
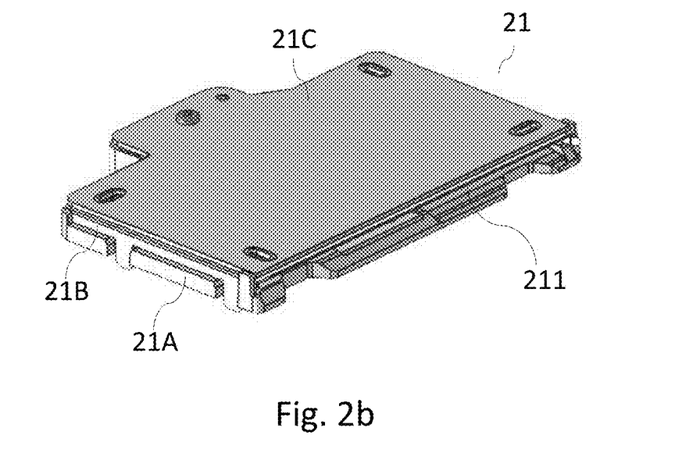
FIG. 2b shows a memory card reader according to one particular embodiment of the proposed technique, once the body of the reader has been assembled.

FIG. 2b shows an example of a memory card reader body according to the proposed technique, once it is assembled. In this embodiment, the body of the memory card reader 21 is a part having a generally rectangular parallelepiped shape with a width of about 55 millimeters, a depth of about 32 millimeters (apart from the connection zone of the Zebra type elastomer connector which will be presented here below) and a height of about 4 millimeters. As described here above with reference to FIG. 2a, this body 21 has a lower base 21A and an upper cover 21B. The lower base 21 and the upper cover 21B have complementary assembling means. When assembled, the lower base 21A and the upper cover 21B together form an insertion slot 211 that enables the insertion of a memory card into an accurate position so that it comes into contact with the memory card connector, once in the stop position. This insertion slot has a height of 0.85 to 1.20 millimeters.

5.2.1 Upper Cover and Printed-circuit Board

Figure 3A:
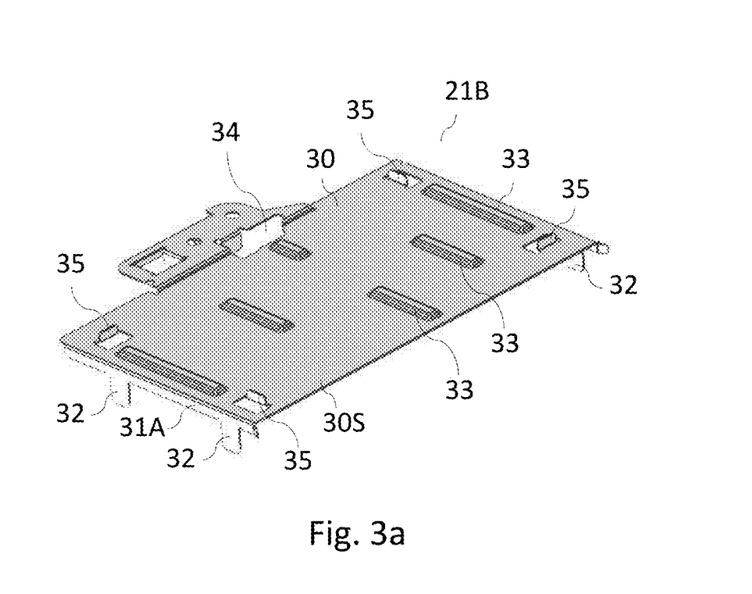
FIG. 3a is a three-quarter view of the upper cover of a memory card reader showing particularly its upper face in one particular embodiment.
Figure 3B:
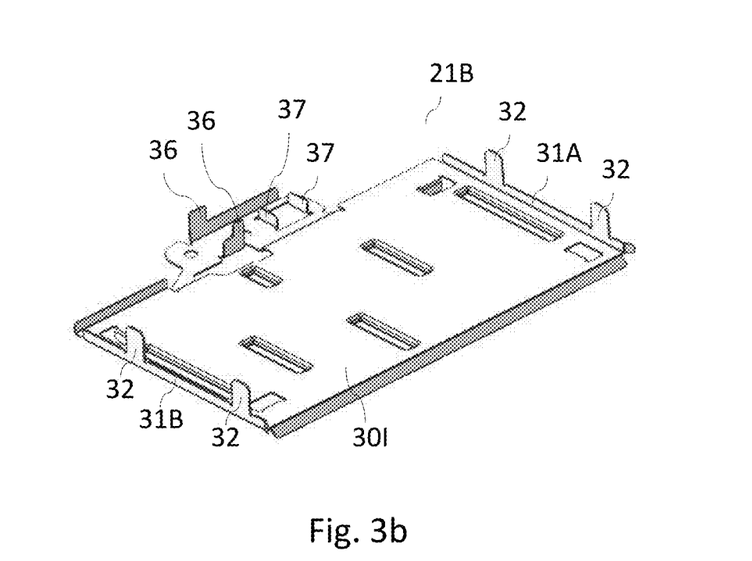
FIG. 3b is a three-quarter view of the upper cover, showing more particularly its lower face in one particular embodiment.

The upper cover 21B of the body of the memory card reader 21 is presented in greater detail with reference to FIGS. 3A and 3B respectively in a top view and bottom three-quarter or perspective view. The upper cover 21B has a generally rectangular parallelepiped shape with a generally flat and rectangular main surface 30 and two side walls (31A, 31B). The side walls are substantially perpendicular to the main surface 30 and comprise means of assembly with a lower base described here below. These means of assembly can for example take the form of assembling toes 32. The main surfaces of the upper cover 21B comprise an upper face 30S and a lower face 30L. One part of the lower face 301 of the upper cover 21B acts as an upper wall of the insertion slot of a memory card, once the body of the memory card reader is assembled. As for the upper face 30S, a major part of it or its totality serves as a receiving surface for affixing a printed-circuit board 21C, said printed-circuit board comprising at least one protection element. In one embodiment, this printed-circuit board 21C is rigid and rests for example on an epoxy type support. According to a preferred embodiment of the proposed technique, the upper cover 21B is metallic. Its shape can then, for example, be obtained very simply by using a simple metallic plate, by means of the usual cutting-out and embossing techniques. The lateral walls (31A, 31B) and the assembling toes 32 can for example be obtained by simple folding of a metal plate of this kind cut out beforehand.

Embossing

Figure 3C:
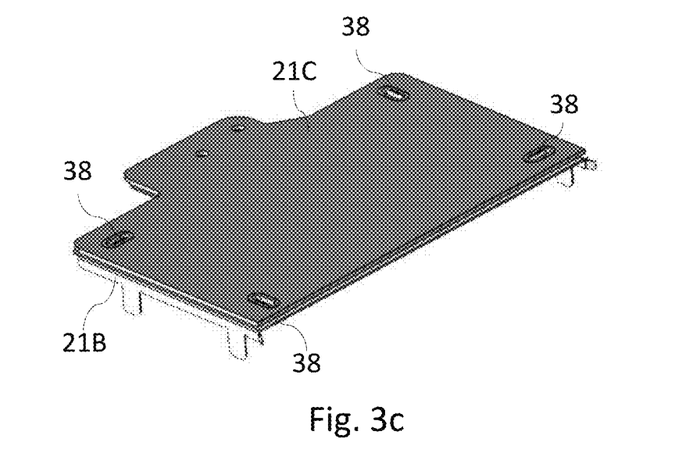
FIG. 3c is a three-quarter view of a printed-circuit board affixed to an upper cover in one particular embodiment.
Figures 3D, 4, 5:
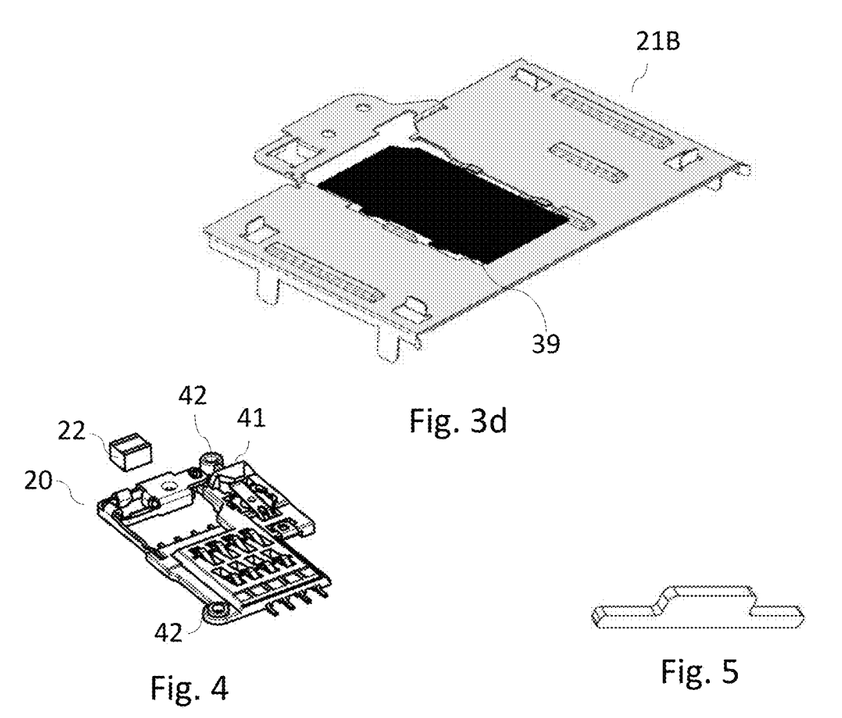
FIG. 3d schematically illustrates another particular embodiment of the upper cover in which the upper cover comprises a card-landing mechanism.
FIG. 4 shows an example of a memory card connector according to one particular embodiment of the proposed technique.
FIG. 5 illustrates an example of a passive baffle that can be soldered to a printed-circuit board in one particular embodiment of the proposed technique.

In one particular embodiment, the upper cover 21B is embossed so as to have protrusions 33 that form a set of protuberances on the upper face 30S (only some protrusions are referenced in FIG. 3s so as not to burden the figure). These protrusions 33, which are substantially rectilinear, have several functions. They serve first of all as support surfaces for the printed-circuit board 21C. In particular, they enable the printed-circuit board 21 to be raised, thus promoting the sliding of a memory card in the reader in preventing any friction by the memory card against the printed-circuit board 21C. The height of these protrusions 33 is furthermore sized in such a way that the printed-circuit board 21C is raised sufficiently to form a receiving housing of a size sufficient for the connector 20. Indeed, in one embodiment of the proposed technique, the upper cover 21B comprises a hole 34 permitting the passage of an zone called a counter-pressure zone of the memory card connector 20 when the reader is assembled. The printed-circuit board 21C must be sufficiently raised to enable the reservation of a space sufficient to receive this counter-pressure zone of the connector 20. FIG. 4, which presents an example of a memory card connector 20 according to the proposed technique, shows a counter-pressure zone 41 of this kind: it corresponds to a part of the connector 20 that is aimed at detecting the card presence detecting switch. This counter-pressure zone fulfills two functions. The first function is to enable matching with the thickness of the card. Indeed, the mounting as proposed leads to a certain degree of tolerance for the height of the memory card reader body as compared with the memory card connector. The counter-pressure element zone makes it possible to manage the slight difference in height in making sure that the card will not be deflected when it is inserted. The second function is to detect the complete insertion of the card (switch system). This second function is for example, fulfilled by the use of a metal spring leaf included in the counter-pressure zone 41. The hole 34 made in the upper cover 21B permits the passage of the upper part of the counter-pressure zone 21 of the connector 20, making it possible to obtain a compact memory card reader (the thickness of the upper cover does not add to that of the connector inasmuch as the hole 34 mentioned here above forms a housing to receive a part of the thickest zone of the connector, namely the counter-pressure zone 41, without in any way sacrificing security (the entire unit is always covered by the printed-circuit board).

Acting as supporting surfaces for the printed-circuit board, the protrusions 33 are present on the upper cover 21B can also serve as surfaces for affixing the printed-circuit board to the upper cover. Different embodiments can then be envisaged to obtain this affixation. When the upper cover is metallic, the printed-circuit board 23C can for example be soldered to the upper cover 21B at the level of these protrusions 33 using for example an SMC (surface-mounted component) reflow soldering technique. In this case, it is necessary to plan in advance for shapes, locations and/or special routings on the printed-circuit board 21C enabling such solders to be made. In particular, soldering zones for grounded soldering are needed. In another embodiment, the affixing can be done by the use of a dual-face adhesive located at the protrusions 33 or throughout the main surface of the upper cover 21B. In this case, it is no longer necessary to provide for particular routings on the printed-circuit board 21C. Other modes of affixing the printed-circuit board to the upper surface can also be planned within the framework of the proposed technique as a complement or alternative to an affixation at the level of the protrusions 33. Thus, in one particular embodiment, the upper cover comprises at least one metal strip 35 extending substantially perpendicularly to its main surface 30, on its upper face 30S side. These metal blades 35 are for example formed during the embossing of the upper cover 21B when this cover is made of metal. These metal blades have a height greater than that of the protrusions 33. In this embodiment, the printed-circuit board 21C comprises metalized via holes that are shaped and sized so that each of them is capable of receiving a corresponding metal strip 35 of the upper cover 21B. The affixing of the printed-circuit board to the upper cover is then provided by means of a soldering operation of a via-component soldering type. The shape and position of the holes can be planned so as to prevent inaccurate mounting of the printed-circuit board on the upper cover (they then act not only as position-correcting elements but also as centering points that ensure accurate positioning of the printed-circuit board so as to ensure a reliable connection of this printed-circuit board with the motherboard in particular when such a connection is provided by a Zebra type elastomer connector). Such metalized holes 38 can for example be seen in FIG. 3C which shows the printed-circuit board 21C once it is installed on the upper cover 21B. These different means for affixing the printed-circuit board to the upper cover are given by way of a non-exhaustive illustration, and other affixing means, for example, based on the use of bonder, screws or again reticulate polymer can also be envisaged. In certain embodiments, screws for assembling the memory card reader can also be buried in the printed-circuit board 21C, again with the aim of compactness.

The protrusions 33 of the upper cover furthermore have a reinforcement role: through their generally rectilinear shape and their distribution throughout the main surface 30 of the upper cover, they reinforce the robustness of the upper cover 21B. The result of this is that this upper cover 21B is more resistant to folding for example. Besides, the affixing of a metal part (i.e. the upper cover 21B thus honeycombed by the presence of these protrusions 33) to the printed-circuit board 21C (generally made of epoxy resin, i.e. thin and relatively brittle) adds a high degree of stiffness to the entire body of the memory card reader.

Protection Elements

As already explained here above, the printed-circuit board 21C comprises at least one protection element. According to one particular characteristic, this protection element (or the plurality of protection elements) extends substantially throughout the surface of the printed-circuit board, and the printed-circuit board 21C is shaped and sized so that, once it is fixed to the upper cover 21B of the body of the reader, it covers its entire upper surface or at least a major part of this surface. In this way, the surface covered by the protection element is substantial and secures the body of the memory card reader efficiently. The mechanical resistance of the upper cover, especially when it is made of metal, further reinforces this securing. Besides, the use of a classic printed-circuit board proves to be less costly and simpler to implement than other prior-art techniques, such as the one in which MID and LDS technologies are used to directly plot a protection element (taking for example the form of a circuit) within the upper cover of the body of the memory card reader. The proposed solution therefore offers a worthwhile compromise because it ensures a major level of security while at the same time being less complex and less costly to implement then the prior-art solutions. Advantageously, the printed-circuit board 21C also offers a surface that can be used for the integration, in addition to the protection element or elements, of other tracks and components necessary to fulfill various other ancillary functions. In this respect, the presence of protrusions 33 on the upper cover 21B can also be of interest in that the elevation obtained for the printed-circuit board enables the exploitation of the internal face of the circuit too (the one that faces the upper face 30S of the upper cover) for the installation of various electronic components.

In one particular embodiment, the protection element takes the form of electronic tracks that form at least one protection lattice. Several lattice densities can be implemented. More particularly, a "high density" zone corresponds to immediate protection (against direct piercing above the connector to access sensitive signals). A "lower density" zone corresponds to protection against indirect attacks (piercing, then insertion of objects slantwise to access sensitive signals as described here above). Such a solution is advantageous because it reduces the cost of manufacture of the printed-circuit board without however impairing security. The lowest density zone more particularly lends itself to the possible integration of tracks and components to fulfill the possible ancillary functions mentioned here above.

Passive Baffles

The protection of sensitive signals liable to be exchanged at the connector is also reinforced in one particular embodiment by the use of passive baffles. The term "passive baffles" is understood to mean shapes that make it more complicated, inside the assembled memory card reader, to access the zones in which such sensitive signals travel. These are therefore passive securing devices that complement the active lattice protection for example. The goal of these shapes is for example to make it more difficult to carry out any attempt to introduce a tool seeking to obtain access to such sensitive zones. These passive baffles can be implemented in different ways.

Thus, according to one particular embodiment, the upper cover comprises passive baffles that take the form of metal tabs (36, 37) obtained for example very simply during the cutting-out and embossing operations performed in order to form the upper cover in question. Such metal tabs can be seen, for example, in FIG. 3B. These metal tabs (36, 37) extend substantially perpendicularly to the lower face 301 of the upper cover 21B. They are shaped and sized so as to act as physical shields around zones in which certain sensitive signals travel. They are for example positioned around zones having relative weakness in terms of security, such as for example zones with holes present in the upper cover 21B. The height of these metal tabs (36, 37) can be variable depending on whether the sensitive signals to be protected are situated in the lower or higher layers of the reader. For example, in FIG. 3b, the passive baffles 37 are aimed at protecting a "high" zone close to the printed-circuit board while the passive baffles 36 are aimed at protecting a "low" zone close to the motherboard, at the position where the memory card connector is soldered. Thus, the metal tabs 36 are for example, positioned as closely as possible to the motherboard component so as to reinforce their protection. The metal tabs 37 are for their part disposed about an elastomer connection (of the Zebra type for example) through which there travel the signals that feed the printed-circuit board 21C: a false contact between these tabs 37 and a protection element of the printed-circuit board 21C therefore leads to the detection of intrusion.

Other types of passive baffles can be implemented, as a complement or as an alternative to the passive baffles formed at the upper metal cover 21B. These additional passive baffles take the form of metal parts (one example of which is given with reference to FIG. 5B) soldered flat on the motherboard (or at very sensitive points of the memory card reader) thus creating robust obstacles that are difficult to circumvent in any attempt to access the sensitive signals.

Card-landing Mechanism

In one particular embodiment, the upper cover 21B comprises a mechanism called a "card-landing" mechanism (sometimes also known in the literature as "landing contact") that have the advantage of minimizing wear and tear in the contacts of the memory card and the metal blades of the connector during numerous insertions and withdrawals of memory cards in the reader. In this embodiment, presented by schematically with reference of FIG. 3d, the card-landing mechanism comprises a mobile counter-pressure element 39 and the upper cover comprises a housing to receive said mobile counter-pressure element 39. The counter-pressure element 39 is mobile between two positions: a position known as the reading position and a position known as the waiting position.

The reading position corresponds to a position in which the mobile counter-pressure element 39 exerts pressure on a memory card inserted into the insertion slot of the memory card reader. This position is the position in which a memory card is read by the reader. The pressure is exerted towards the connector, when the memory card is inserted completely (in other words, up to the stop point) into the insertion slot of the memory card reader. This position ensures reliable contact between the contacts of the card and the metal blades of the connector.

The waiting position corresponds to a position in which the mobile counter-pressure element 39 is at least partially disposed in its receiving housing within the upper cover. This position is occupied by the mobile counter-pressure element 39 when no memory card is inserted into the reader or when a card is only partially inserted therein (in other words, the stop point of the card has not yet been reached). The mobile counter-pressure element then does not exert any pressure on the card or else very low pressure which limits or does not enable contact between the contacts the card and the metal blades of the connector.

According to one particular characteristic, the receiving housing for the mobile counter-pressure element 39 can take the form of a hole in the upper cover 21B. Once fixed, the printed-circuit board 21C then acts as a lid or a "roof" for this receiving housing in covering and therefore protecting this hole. In this way, the memory card reader remains compact without sacrificing security. As an alternative, the upper cover 21B has no hole and the mobile counter-pressure element 39 is placed against the lower wall of the upper cover or inner hollow made in the upper cover in its waiting position. Such an implementation is more robust but requires increased thickness of the upper cover and therefore of the memory card reader.

If the card-landing function is known per se, its implementation in the context of the present embodiment differs from the prior-art solutions in which the card-landing mechanism is generally a point of weakness for the securing of the reader. Indeed, with the proposed technique, the printed-circuit board 21C completely protects the card-landing mechanism by covering it totally.

5.2.2 Lower Base

Figure 6A:
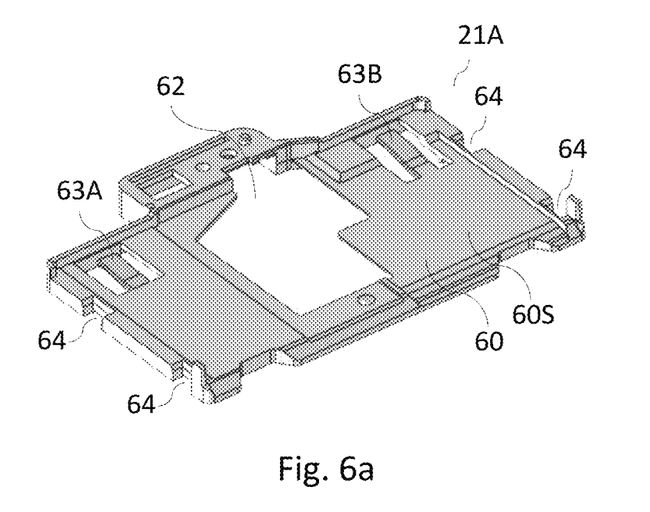
FIG. 6a is a three-quarter view of the lower base of a memory card reader, showing more particularly its upper face in one particular embodiment.
Figure 6B:
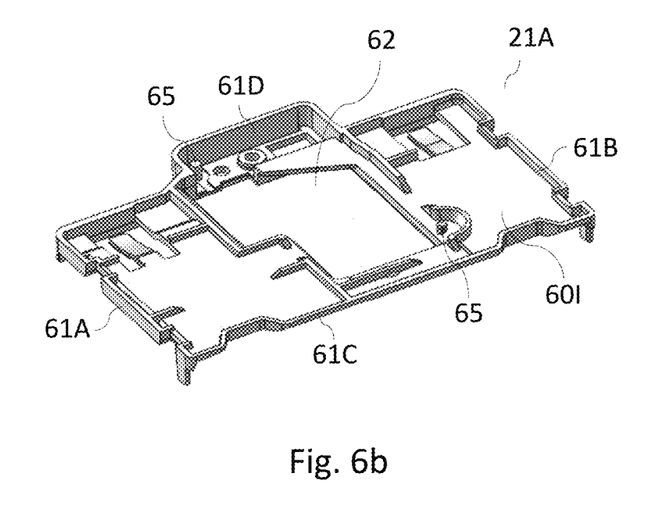
FIG. 6b is a three-quarter view of the lower base, showing more particularly its lower face in one particular embodiment.

The lower base 21A of the body of the memory card reader 21 is presented in greater detail with reference to FIGS. 6A and 6B respectively in a top and bottom three-quarter or perspective view in one particular embodiment of the proposed technique. The lower base 21A has a generally rectangular parallelepiped shape. It also comprises a main surface 60, two side walls (61A, 61B) and two generally longitudinal walls (61C, 61D). The upper face 60S of the main surface 60 is the face in contact with the memory card when it is inserted into the reader: this upper face 60S is therefore generally smooth. The lower face 601 is the face in contact with the memory card to which the connector of the card reader is connected. This lower face 601 is structured in order to receive especially electronic components that are soldered to the motherboard and which the lower base 21A covers, thus providing a certain degree of physical protection for these components. Thus, the height of the side walls (61A, 61B) and longitudinal walls (61C, 61D) is adapted to the height of the electronic components that take position beneath the lower face 21A.

As already described here above, the lower base 21A also comprises a housing to receive the memory card connector during the mounting of the memory card reader. This housing takes the form of hole 62 passing through the lower base 21A from one side to the other. The shape of this receiving housing 62 is substantially complementary to the shape of the memory card connector 20. In one particular embodiment, the lower base 21A comprises centering pins 65, to carry out accurate centering of the lower base on the connector 20 during the mounting (the memory card connector 20 then comprises complementary holes 42, which can be seen in FIG. 4, designed to receive the centering pin 65 of the lower base). The unit formed by the connector 20 surrounded by the lower base 21A will thereafter be covered by the upper cover 21B in order to form an insertion slot having the space needed for the presence of a memory card, as well as other possible electronic components.

In the embodiment presented, the lower base 21A of the body of the connector has the main function of guiding the card when it is inserted into the memory card reader. In addition, ingeniously, in at least one variant, the lower base 21A comprises one or more of the following characteristics:
- it integrates card-braking elements to avoid impact on the card stops; such card-braking elements are presented, by way of an example, on the lower base 21A illustrated in FIGS. 6A and 6B: the card braking elements are constituted, in this embodiment, by two blades made of plastic (63A, 63B), each of these blades forms a pre-determined angle relative to memory card guiding (flat) surface; depending on the embodiment, the angle of tilt of one strip could be different from the angle of tilt of the other strip; in this embodiment, the braking elements (63A, 63B) are positioned on each side of the lower base 21A; other modes of positioning can of course be envisaged; it must be noted that the card braking can, as an alternative and in another embodiment, be integrated into the upper cover rather than into the lower base;
- it is made out of a dissipative material, thus limiting the effects of electrostatic discharge on a reader terminal; this characteristic of electrostatic discharge can be coupled with the previous characteristic; the blades, each having a different tilt, are capable of braking the card on the one hand and of discharging its static electricity on the other hand, in doing so gradually;
- it is made out of a transparent or translucent material to enable the illumination of the slot homogeneously and thus make the zone for receiving the memory card more visible to a user;
- it comprises a protection element on its lower face.

These complementary characteristics ingeniously flow from the use of a reader body that has an insertion slot obtained by the assembling of two parts that can be fitted to each other (lower base and upper cover). Indeed, such characteristics cannot be implemented with a reader body formed by a single part because the technical level of these characteristics prevents it. Thus, for example, it would be highly complicated (and costly) to make a reader body that might comprise a transparent portion and an opaque portion. In the embodiment presented with reference to FIGS. 6A and 6B, the side walls (61A, 61B) of the lower base 21A comprise passages 64 designed to receive complementary assembling toes of the upper cover 21B (the assembling toes 32 of FIGS. 3A and 3B). These assembling toes, when made of metal, can furthermore be soldered to the motherboard to further reinforce their robustness of the assembled reader. Embodiments other than those illustrated can clearly be envisaged for the assembling of the upper cover 21B on the lower base 21A.

The characteristics presented in the different embodiments described can naturally be combined individually or as a group, with the general principle described here above without departing from the framework of the invention.

5.3. Complementary Characteristics and Assembling Method

According to another particular characteristic of the proposed technique, the connection between the printed-circuit board and the motherboard is obtained by means of an elastomer connector for example the Zebra™ type. Thus, there is no need for a complex mechanism for soldering the body of the memory card reader to the motherboard: indeed, since the connection is provided by means of an elastomer connector, the mounting of the assembly formed by the memory card connector, the elastomer connector and the memory card reader body is made easier. The exploded view of FIG. 2a shows an elastomer connector 22 of this kind and the way in which it can be implemented in one particular embodiment. More particularly, the lower base 21A and the upper cover 21B each include a hole enabling the fitting in of the elastomer connector 22 during the assembling of the reader.

Figure 7:
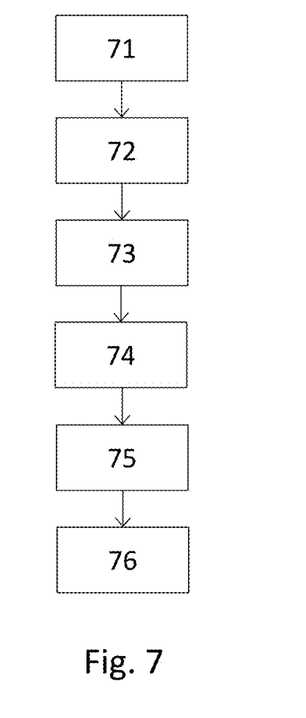
FIG. 7 illustrates the main steps of a method for assembling a memory card reader according to one particular embodiment of the invention.

Referring to FIG. 7, we describe the main steps implemented to carry out the assembly of a memory card reader in one particular embodiment of the proposed technique. Thus, the method for assembling the memory card reader comprises the following steps:
- a step for affixing 71 the memory card connector 20 to the motherboard; this affixation can be done by screwing or soldering or by bonding or by a combination of these methods; other affixing methods can also be used;
- a step for placing 72 the elastomer connector, when it used (the positioning of the elastomer connector can advantageously be done in a zone left free for this purpose within the memory card connector);
- a step for positioning 73 the lower base on the memory card connector so that the memory card connector takes position within the housing reserved for it in the lower base;
- a step for joining 74 the upper cover to the lower base;
- a step for affixing 75 the printed-circuit board to the upper face of the upper cover;
- optionally, a complementary step for affixing 75 the memory card reader thus assembled to the motherboard, for example, by means of a through screw that gets held in a part of the memory card connector (screw 23 of FIG. 2a).

Thus, all that are needed are a few simple steps to assemble and affix the memory card reader to the motherboard. As already described here above, the printed-circuit board can be affixed to the upper cover prior to the mounting of the memory card reader. In this case, the steps 74 and 75 are replaced by a single assembling step for the joining, to the lower base, of the pre-assembled unit formed by the upper cover surmounted by the printed-circuit board.

The invention claimed is:

1. A memory card reader body of a generally parallelepiped shape comprising:
    an upper cover and a lower base, wherein said upper cover is made out of metal, said lower base and upper cover form a slot for insertion of a memory card and said lower base comprising a housing to receive a memory card connector; and
    a printed-circuit board affixed to an upper face of said upper cover, said printed-circuit board comprising at least one protection element taking the form of at least one lattice, an etching density of said protection element being variable according to a location of said protection element.

2. The memory card reader body according to claim 1, wherein said printed-circuit board covers a major part of the upper face of said upper cover.

3. The memory card reader body according to claim 1, wherein said protection element extends substantially over a major part of said printed-circuit board.

4. The memory card reader body according to claim 1, wherein said upper cover comprises at least one protrusion extending substantially perpendicularly to said upper face of the upper cover.

5. The memory card reader body according to claim 1, wherein said upper cover comprises, in proximity to a hole passing through said upper cover, at least one metal tab extending substantially perpendicularly to a lower face of the upper cover.

6. The memory card reader body according to claim 1, wherein said upper cover comprises at least one card-landing mechanism.

7. The memory card reader body according to claim 6, wherein said card-landing mechanism comprises a mobile counter-pressure element and said upper cover comprises a housing to receive said mobile counter-pressure element, said mobile counter-pressure element being mobile between two positions:
   a position of reading in which said mobile counter-pressure element exerts pressure on a memory card inserted into the insertion slot of the memory card reader;
   a waiting position in which said mobile counter-pressure element is at least partially positioned in said receiving housing.

8. The memory card reader body according to claim 7, wherein said housing to receive the mobile counter-pressure element takes the form of a hole within said upper cover.

9. The memory card reader body according to claim 1 wherein the lower base comprises at least one card-braking device.

10. The memory card reader body according to claim 1, wherein the lower base comprises at least one electrostatic discharge zone.

11. A memory card reader terminal comprising the memory card reader body according to claim 1.

12. A method for assembling a memory card reader, comprising:
   affixing a memory card connector to a motherboard;
   positioning a lower base on said memory card connector;
   assembling an upper cover on said lower base, wherein said upper cover is made out of metal, said lower base and upper cover forming a slot for insertion of a memory card;
   affixing a printed-circuit board to an upper face of said upper cover, said printed-circuit board comprising at least one protection element taking the form of at least one lattice, an etching density of said protection element being variable according to a location of said protection element.

* * * * *